United States Patent [19]
Jenkins

[11] 4,040,114
[45] Aug. 2, 1977

[54] MAGNETIC TAPE REPRODUCING APPARATUS WITH MANUALLY OVERRIDEABLE CONNECTION BETWEEN TAPE LIFTER AND PRESSURE ROLLER

[75] Inventor: John P. Jenkins, Towanda, Ill.

[73] Assignee: International Tapetronics Corporation, Bloomington, Ill.

[21] Appl. No.: 678,307

[22] Filed: Apr. 19, 1976

[51] Int. Cl.$^2$ .................. G11B 15/60; G11B 27/02
[52] U.S. Cl. ........................................ 360/130; 360/13
[58] Field of Search ................................. 360/130, 13

[56] References Cited

U.S. PATENT DOCUMENTS

| | | | |
|---|---|---|---|
| 3,372,938 | 3/1968 | Hoag | 360/130 |
| 3,506,271 | 4/1970 | Greifenmagen et al. | 360/130 |
| 3,623,644 | 11/1971 | Olsen | 360/130 |

*Primary Examiner*—Robert S. Tupper
*Attorney, Agent, or Firm*—McCaleb, Lucas & Brugman

[57] ABSTRACT

Reproducing apparatus for magnetic tape having a pressure roller mounted on a first movable member and a tape lifter mounted on a second movable member. Solenoid and spring means connected to the first movable member moves the pressure roller between a tape-driving position pressing the tape into frictional driving engagement with a capstan, and a non-tape-driving position spaced from the capstan. Mechanical connecting means between the movable members moves the tape lifter between lifted and lowered positions in response to movement of the first member between its non-tape-driving and tape-driving positions. The mechanical connecting means includes a lost motion connection enabling manual override movement of the tape lifter between its lifted and lowered positions when the first member is in its non-tape-driving position for fast mode operation. This enables manual adjustment of tape proximity to the head, and therefore adjustment of audio output level while editing or scanning the tape in a fast mode. The mechanical connecting means also includes manually overrideable detent means to hold the tape lifter in lowered position when the first member is in the non-tape-driving position to provide preselected audio output level while editing the tape in fast mode.

8 Claims, 5 Drawing Figures

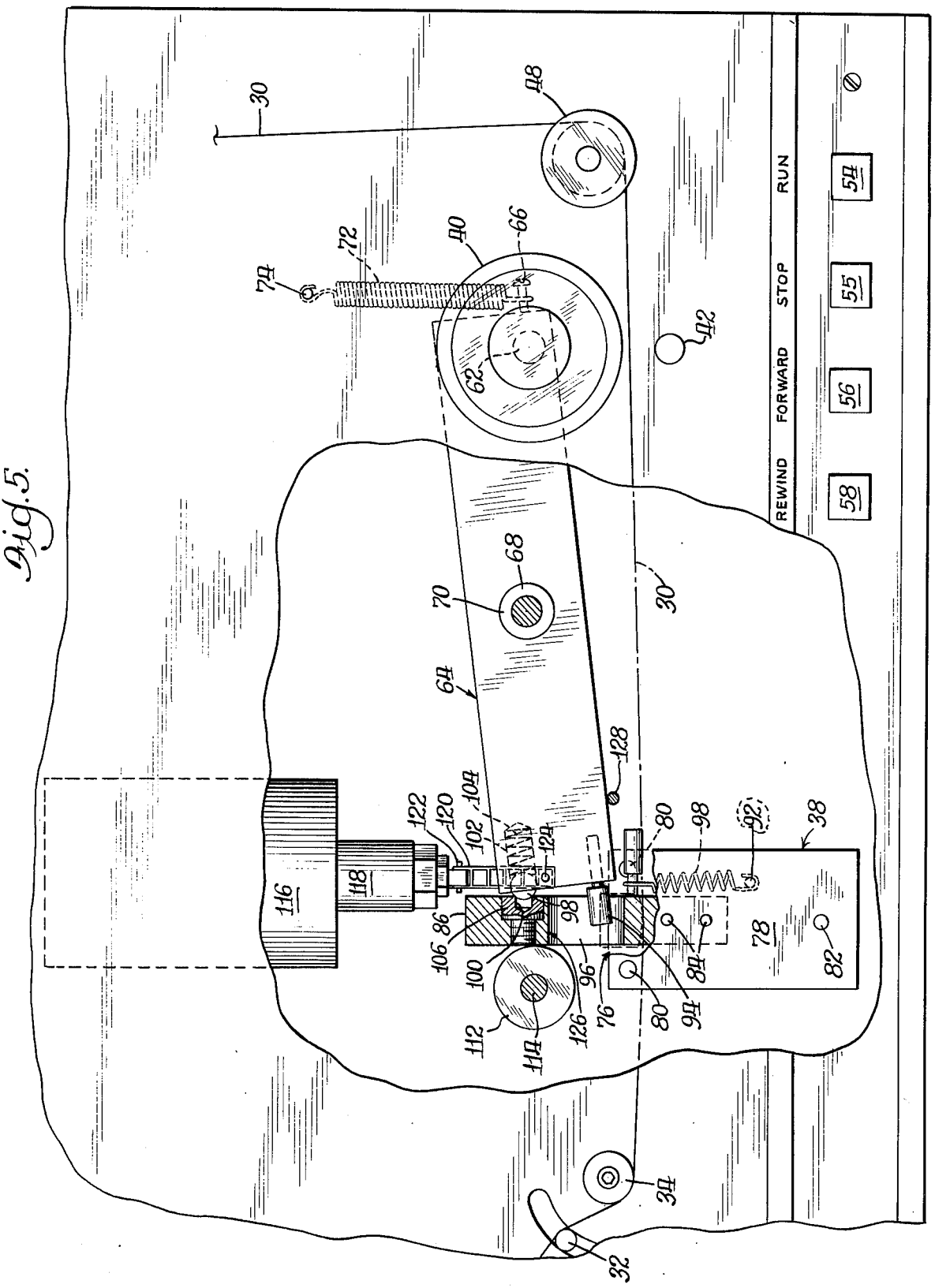

MAGNETIC TAPE REPRODUCING APPARATUS WITH MANUALLY OVERRIDEABLE CONNECTION BETWEEN TAPE LIFTER AND PRESSURE ROLLER

CROSS REFERENCES TO RELATED APPLICATIONS

Reference is made to the following co-pending related patent applications assigned to the same assignee: Jenkins application for Ser. No. 677,539, filed Apr. 16, 1976 on MAGNETIC TAPE REPRODUCER WITH SERIES INTERCONNECTED TORQUE MOTORS IN PLAY MODE.

BACKGROUND OF THE INVENTION

The invention relates to reproducing apparatus for magnetic tape and particularly to such apparatus for use in commercial radio broadcasting where it may be required to operate continuously with the highest possible standards of reliability of durability.

Typically, such apparatus is selectively operable in at least three basic modes including play mode, fast forward mode, and fast rewind mode. Some have an additional edit mode in which the audio content of the tape can be scanned at fast speed. In the play mode, forward and rewind reels are simultaneously urged in opposite directions by forward and rewind torque motors to tension the tape, the tape lifter is in lowered position enabling the tape to engage the head, and the pressure roller presses the tape against the capstan to move the tape forward at a lineal speed determined by the rotational speed of the capstan. In either fast mode, the appropriate forward or rewind torque motor is energized, the tape lifter holds the tape off the head and the pressure roller is held spaced from the capstan to free the tape from the capstan and enable the tape to be moved at fast speed determined by the energized torque motor and the diameter of tape wrap on the driving reel. In edit mode, the tape is run at fast speed in pickup proximity to the head with the audio on enabling the operator to quickly scan the tape for the general location of a particular cut or selection. Thus, edit mode is a variation of fast mode with the audio circuit energized, and the proximity of the tape to the head may be variable to adjust the volume of the audio output for edit purposes.

Normally, for play mode and either fast mode, movements of the tape lifter and pressure roller may be automatically interrelated so that when the tape lifter is lowered to enable the tape to engage the head, the pressure roller presses the tape against the capstan; and when the tape lifter lifts the tape from the head, the pressure roller moves away from the capstan enabling the tape to run freely and rapidly past the capstan. But, for edit mode, there must be capability of manually overriding this relationship so the tape can be moved into engagement, or pickup proximity, with the head when the pressure roller is spaced from the capstan.

In conventional reproducing apparatus where the tape lifter and pressure roller are interrelated as described above, this is done by relatively complicated solenoid or mechanical arrangements which are costly to manufacture, not as long lasting and reliable as desired; and the means for overriding this relationship in edit mode is relatively complicated and not entirely satisfactory.

BRIEF SUMMARY OF THE INVENTION

A general object of the invention is to provide magnetic tape reproducing apparatus which is simple and inexpensive to manufacture and operate and is capable of continuous operation while meeting the highest standards of reliability and durability required by the broadcasting industry.

An important object is to provide mechanical connecting means between movable members which carry the pressure roller and the tape lifter, such means including a lost motion connection enabling manual override movement of the tape lifter carrying member relative to the pressure roller carrying member during an edit mode to facilitate scanning the tape at fast speed.

Another object is the provision in the above mentioned mechanical connecting means of detent means capable of holding the tape lifter in fully lifted position to enable the tape to engage the head and thereby provide a preselected audio output level while editing and scanning the tape in fast mode operation.

Another object is to provide means for automatically releasing the above-mentioned detent means when the apparatus is changed from either fast mode to play mode.

A specific object of the present invention is to provide magnetic tape reproducing apparatus in which the pressure roller is mounted on a pivotal first member and the tape lifter is mounted on a reciprocal second member. There is mechanical connecting means between the two members comprising a lost motion connection and a detent connection. The lost motion connection consists of a pin extending from one of the members into a slot in the other member. The detent connection consists of a spring-pressed element in one of the members engageable with a recess in the other member. This mechanical connecting means enables automatic simultaneous engagement of the tape with the head and capstan when the apparatus is placed in play mode and further automatic simultaneous disengagement of the tape from the head and capstan in either fast mode. The lost motion connection enables separate manual override movement of the second member to move the tape lifter independently of the pressure roller thereby enabling manual variation of the proximity of the tape to the head in an edit mode while the pressure roller is disengaged from the capstan. In such edit mode, the second member can be moved manually, within limits of the lost motion connection, to a "lowered" position where it is held stably by the detent connection, subject to manual override, or to automatic override when the apparatus is placed in play mode. In that stable lowered position of thesecond member, the tape lifter completely disengages the tape, enabling the tape to fully engage the head to provide a steady maximum audio output preselected by appropriate adjustments in the audio circuit.

BRIEF DESCRIPTION OF THE DRAWINGS

Other objects and advantages will be apparent from the following description taken in connection with the drawings in which:

FIG. 5 is a view similar to FIG. 3 showing the tape lifter releaseably held in lowered position by the detent means, it being understood that the term lowered refers to the condition where the tape lifter is moved away from the tape enabling the tape to engage the head.

Like parts are referred to by like reference characters throughout the figures of the drawings.

GENERAL DESCRIPTION

Figure 2:
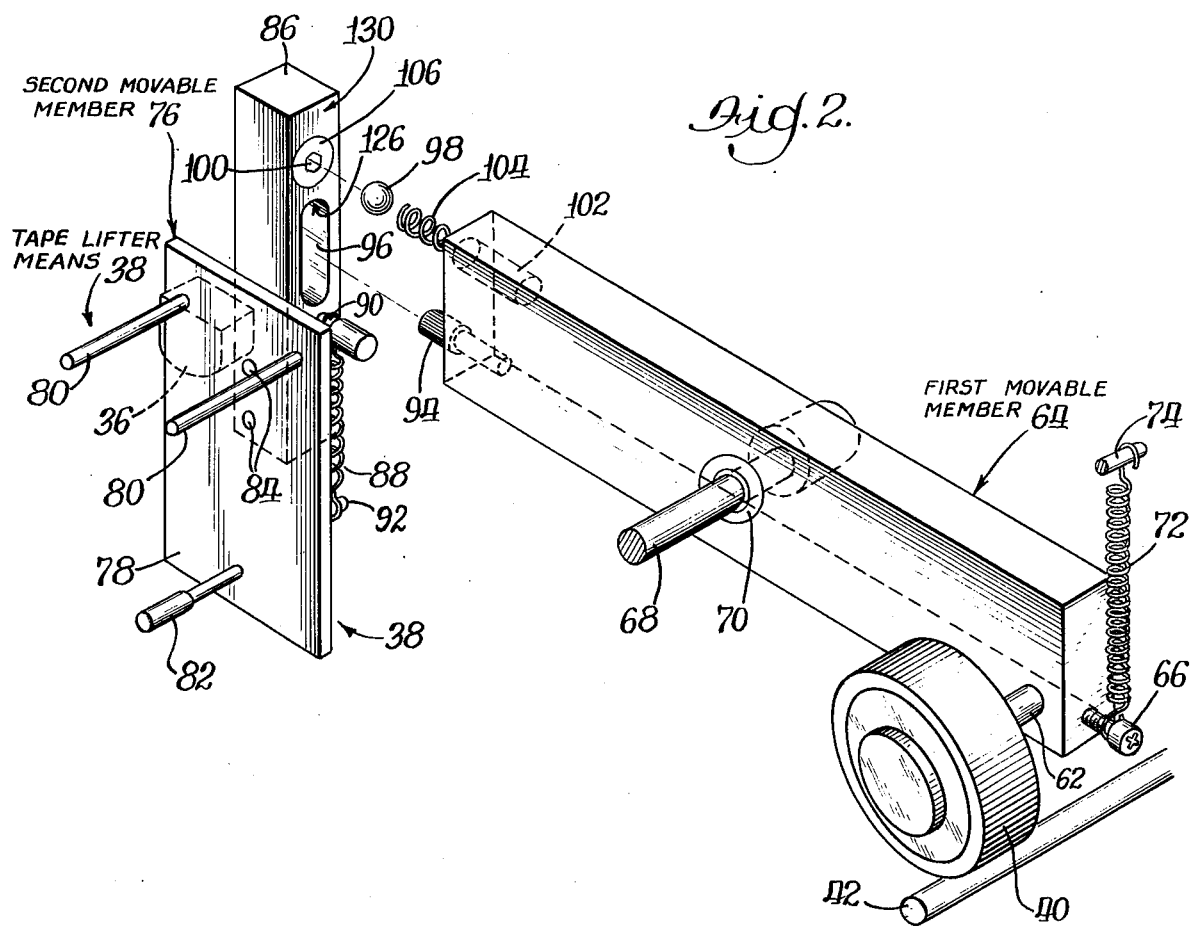
FIG. 2 is an enlarged, exploded perspective view of portions of the apparatus shown in FIG. 1, illustrating two movable members supporting the tape lifter and pressure roller, respectively, and the mechanical connecting means including the lost motion and detent connections between the two movable members.

Except for the parts shown in FIG. 2, the drawings illustrate a reel-to-reel reproducer generally similar to the kind used in the broadcasting industry so will not be described here in detail. Briefly, it comprises a tape deck housing 20 having forward and rewind reels 22 and 24 driven by forward and rewind torque motors 26 and 28, respectively. The ends of a magnetic tape 30 are wound upon the reels and the tape is trained for movement along a path extending past a tensioning arm 32, guide roller 34, reproducing head 36, tape lifter means generally designated 38, between a pressure roller 40 and capstan 42, between an infrared lamp 46 and sensor 44, and guide roller 48. The capstan is driven at constant speed by a motor 50. A hinged cover 52 provides ready access to the head and that part of the tape engaging the lifter means.

A control circuit (not shown) may be employed similar to that shown and described in applicant's prior U.S. Pat. No. 3,869,719 dated Mar. 4, 1975 entitled AUTOMATIC SEQUENCE CONTROL FOR REPRODUCING APPARATUS. Briefly, pressing "Run" or "Start" button 54 places the apparatus in play mode. "Forward" button 56 places it in fast forward mode. "Rewind" button 58 places it in fast rewind mode. And an optional "Edit" button 60, if employed, places it in edit mode enabling the tape to be scanned at fast speed with the audio circuit on while the tape engages the head or is manually adjustable relative to the head to vary the playback volume. One circuit illustrating the edit mode is shown and described in applicant's U.S. patent application Ser. No. 489,614, now U.S. Pat. No. 3,942,189, on MAGNETIC TAPE REPRODUCING APPARATUS WITH SOLENOID ACTUATED TAPE LIFTER MEANS AND AUTOMATIC CONTROL THEREFOR.

Figure 3:
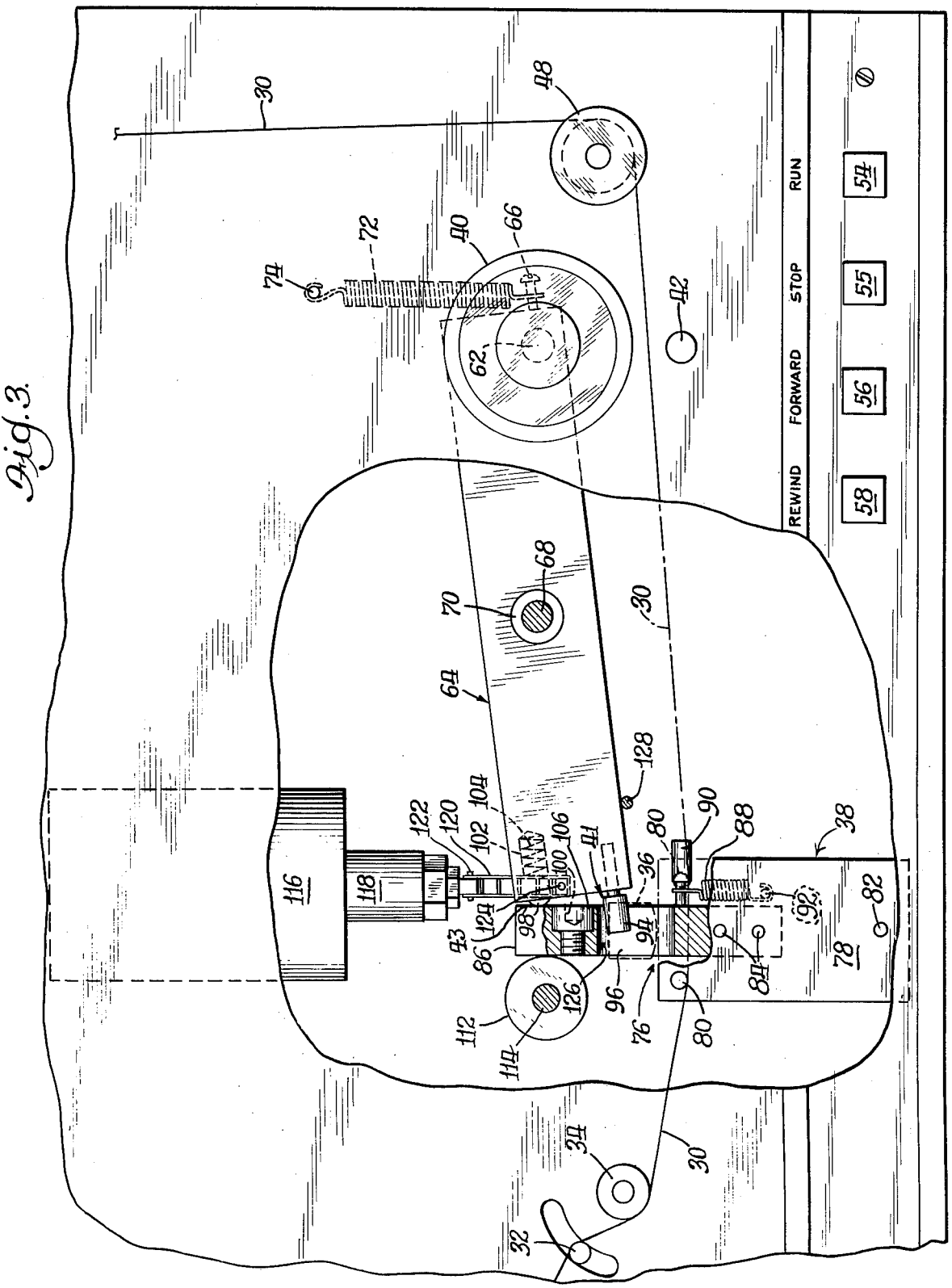
FIG. 3 is a fragmentary enlarged view of FIG. 1 showing the position of the parts illustrated in FIG. 2 when the apparatus is in any one of the off, fast forward, fast rewind, or edit modes.

Refer now to the parts comprising the heart of the invention shown in FIG. 2. The pressure roller 40 is rotatably mounted on a shaft 62 and held on a first movable member 64 by a set screw 66. The member 64 is here illustrated as a lever pivotably journaled about a pivot bolt 68 extending through bushing 70 into the deck 20. A spring 72 is fastened at one end to set screw 66 on lever 64 and at the other end to a pin 74 on the deck. The spring biases the lever 64 in a direction urging the pressure roller away from the capstan as shown in FIG. 3.

The tape lifter means 38 is mounted on and part of a second movable member generally designated 76 which is vertically reciprocal on the tape deck housing 20. It comprises a flat plate 78 having forwardly extending, tape-engageable lifter bars 80, 80 and a manually manipulatable cue shaft 82. Plate 78 is attached as by screws 84 to a vertical block 86. A biasing spring 88, connected between a pin 90 on the block and a pin 92 on the tape deck housing, urges the tape lifter assembly downward to lift the tape from the head 36.

Mechanical connecting means is provided between first movable member 64 and second movable member 76, automatically correlating movements of the tape lifter means 38 and the pressure roller 40 for the different operational modes. This mechanical connecting means comprises a lost motion connection generally designated 41 and a detent connection generally designated 43. The lost motion connection comprises a pin 94 on the end of lever 64, extending into an elongated vertical slot 96 in block 86. The detent connection comprises a spring-pressed ball 98 carried by lever 64 engageable within a recess 100 in block 86. The ball 98 is slidable within a bore 102 in lever 64. A spring 104, seated within that bore, presses the ball toward recess 100. In the present case, the recess 100 is illustrated as the hexagonal socket of a socket head bolt threadedly engaged within the block 86 having its head end flush with the side surface 130 of the block to provide a smooth, flat surface along which the detent ball is movable.

The tape lifter means 38 may be guided for vertical movement on the tape deck housing 20 by any suitable means. Here the guide means includes guide slots 108, 108 and 110 in the housing for lifter bars 80, 80 and cue shaft 82 respectively; and a guide roller 112 engaging the side block 86, the roller being rotatably journaled on shaft 114 fastened to the back side of the housing. A pinch solenoid 116 has a plunger 118 connected as by means of a flexible chain 120 and connecting pins 122, 124, to the end of lever member 64 opposite the pressure roller 40. When the solenoid 116 is energized, it pulls plunger 118 and the end of lever 64 upward. This rotates lever 64 clockwise about pivot bolt 68, causing pressure roller 40 to press the tape 30 into frictional driving engagement with the rotating capstan 42. This moves the tape in a forward direction as shown by the arrows in FIG. 4, at a speed determined by the rotational speed of the capstan. When the lever 64 is so moved by the solenoid, the pin 94 at the end of the lever engages the upper inner end surface 126 of slot 96 and moves the tape lifter means or assembly to the position also shown in FIG. 4. This moves the tape lifter bars 80, 80 to the FIG. 4 lowered position enabling the tape to engage the head 36 as shown.

Figure 1:
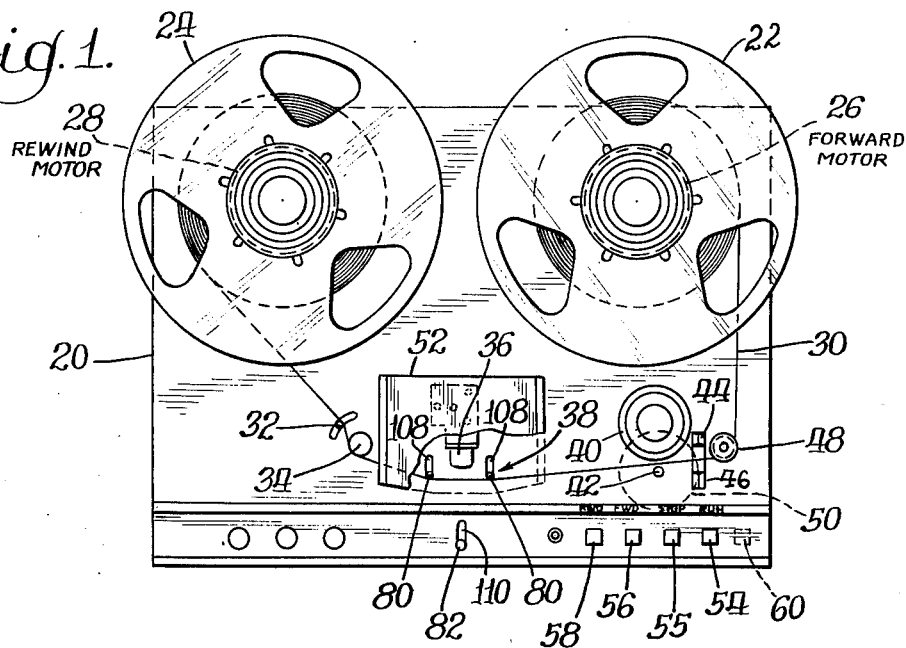
FIG. 1 is a front overall view of reproducing apparatus employing the present invention
Figure 4:
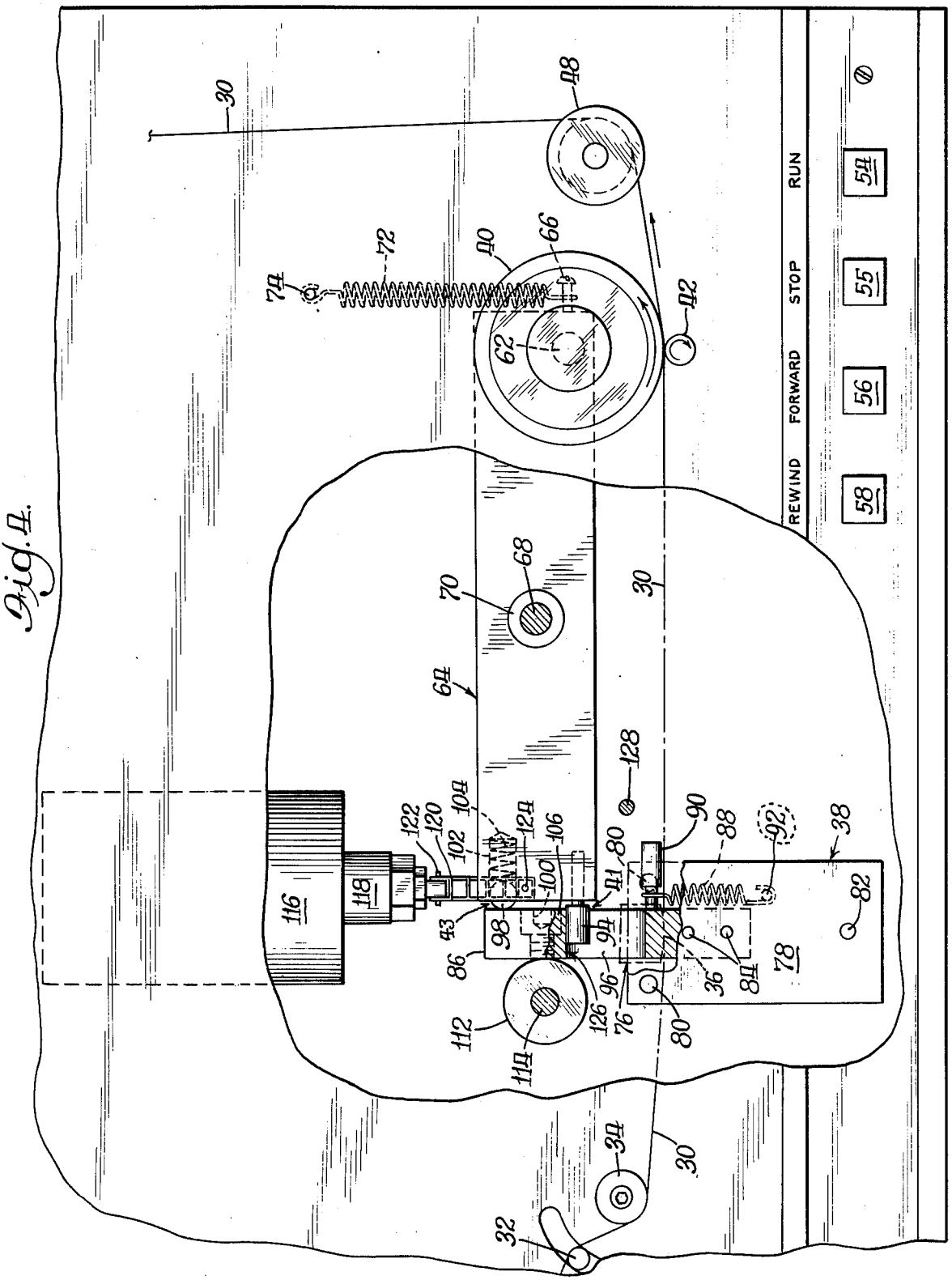
FIG. 4 is a view similar to FIG. 3 showing the parts in play mode (sometimes referred to as the start or run mode)

Before proceeding further with the description, conventional terminology respecting the lifted and lowered positions of the tape lifter assembly 38 will be described to avoid possible confusion by those unfamiliar with it. When the tape lifter bars 80, 80 are moved in a direction to hold the tape away from the head, this is referred to as the "lifting" direction even though the movement is downward as is the case here. Likewise, movement of the tape lifter in the direction to release the tape and enable the tape to engage the head is referred to as the lowering direction even though the movement is upward as is the case here. For this reason, the position of the tape lifter assembly in FIGS. 1, 3 and 5 is called the lifted position; and that shown in FIG. 4 is the lowered position.

Thus, energization of solenoid 116 moves the first movable member, namely the lever 64, in a direction causing pressure roller 40 to press the tape 30 into frictional driving engagement with the capstan 42, and simultaneously moves the second movable member 76 to move the tape lifter assembly into lowered position in which the tape engages the head 36. This is the play or run mode condition shown in FIG. 4 and occurs in response to pressing the run button 54 through a conventional circuit, not shown here but described and shown om applicant's above-mentioned U.S. Pat. Ser. No. 3,869,719

Pressing the stop button 55, among other actions, deenergizes solenoid 116, enabling the spring 72 to rotate the lever 64 counterclockwise to a position limited by stop pin 128 which is fastened to the back of the tape deck housing 20. Simultaneously, the second movable member 76, with tape lifter assembly 38, is moved downward by spring 88 to its lifted position in which lifter bars 80, 80 hold the tape disengaged from the head. This is illustrated in FIG. 3 which shows the tape disengaged simultaneously from both the capstan 42 and the head 36. FIG. 3 shows the positions of the first and second movable members 64 and 76, the pressure roller 40, and the tape lifter assembly 38, in the off mode condition, in either fast forward or fast rewind mode condition, and in the edit mode condition.

Pressing button 56 places the apparatus in fast forward mode through the control circuit above mentioned but not shown, thereby disengaging the tape from the capstan and head as shown in FIG. 3, and energizing forward torque motor 26 to wind tape onto reel 22 at fast speed. In this mode, rewind torque motor 28 is not energized and any brake associated with it will preferably be released to allow the rewind reel 24 to pay off tape freely. Likewise, pressing button 58 places the apparatus in fast rewind mode, rewinding tape at fast speed onto reel 24 while it is disengaged from the capstan and head as shown in FIG. 3.

Consider now the condition where the operator desires to place the apparatus in edit mode and scan the tape quickly to locate a particular cut or selection, or merely to locate the end of a long leader. He presses the fast forward button 56, thereby moving the tape 30 fast, in a forward direction, with the parts positioned as shown in FIG. 3. If the audio portion of the control circuit is not on, he may turn it on by making suitable adjustment of an audio control (not shown). Alternatively, the apparatus may include an edit mode circuit, actuatable by pressing button 60 shown in broken lines only in FIG. 1. This simultaneously places the apparatus in fast forward mode and turns the audio circuit on so the operator can hear the recording on the tape. It will of course be moving too fast for the recording to be understood, but the operator can quickly determine whether there is a recording or not, and generally locate the end of a long leader, or recorded portions between cuts, and will even be able to distinguish voice from music and even different kinds of music. Such an edit mode circuit is illustrated and described in the above-mentioned Jenkins U.S. patent application Ser. No. 489,614.

With the edit mode established as described above, and with the parts as shown in FIG. 3, the operator can grasp the cue shaft 82 and move the entire second movable member 76, with tape lifter assembly 38, upward, against the relatively small bias of the spring 88. This moves tape lifter bars 80, 80 upward, bringing the fast moving tape closer to the head 36. By moving the cue shaft 82 up and down manually, the operator can find a position where the tape is just close enough to the head to generate a suitable audio response at a comfortable playback volume. When he finds the general location of the tape portion sought, he can reverse briefly and then play forward at play speed to locate it precisely.

The tape can be scanned in edit mode by manually lifting the cue shaft 82 all the way up to the FIG. 5 position where the detent connection will hold the second movable member 76 stably in that position, without the necessity of manually holding cue shaft 82. In this condition, the tape lifter assembly 38 will be held in lowered position with the tape fully engaging the head. In this case, playback volume may be maintained at some preselected level by suitable adjustments in the audio control circuit.

Thus, the second movable member 76 which carries the tape lifter assembly is automatically movable in response to movement of the first movable member 64 which carries the pressure roller when the apparatus is placed in any one of the run, fast forward, fast rewind, off and edit modes. And the position of the second movable member in fast mode or edit mode can be manually overridden by grasping cue shaft 82, either to adjust the audio volume during scanning by varying the proximity of the tape to the head, or by moving the tape lifter assembly all the way to the position shown in FIG. 5 where it will be held stably in that position by the detent means described. The detent position of FIG. 5 can also be overridden manually by simply grasping the cue shaft 82 and moving it downward. Alternatively, the detent position of FIG. 5 can be overridden automatically by pressing run button 54 to place the apparatus in play mode.

Assuming the position of the second movable member shown in FIG. 5, when button 54 is pressed to place the apparatus in play mode, the detent means will be automatically overridden when the solenoid pulls the lever 64 upward. This moves the detent ball 98 upward, along the smooth side surface 130 of the block 86, disengaging the ball from the socket 100 and allowing the entire second movable member 76 with tape lifter 38 to begin dropping under the urgence of spring 88 until the slot end surface 126 is engaged by the pin 94 as illustrated by the play mode position shown in FIG. 4.

While one form in which the present invention may be embodied has been shown and described, it will be understood that various modifications may be made within the spirit and scope of the invention which should be limited only by the appended claims.

The embodiments of the invention in which an exclusive property or privilege is claimed are defined as follows:

1. In reproducing apparatus for a magnetic tape having a housing, tape drive means for moving the tape past a reproducing head and between a capstan and pressure roller, a tape lifter movable between a lowered tape-free position enabling the tape to engage the head for play mode operation and a lifted position engaging and lifting the tape from the head for fast mode operation, and control means selectively activatable to place said apparatus in play and fast modes in which said tape drive means moves said tape at play and fast speeds respectively, the improvement comprising:

the pressure roller being carried on a first movable member for movement toward and away from said capstan;

the tape lifter being carried on a second movable member for movement between its said lowered and lifted positions;

first biasing means urging said first movable member in a direction to move said pressure roller away from said capstan;

second biasing means urging said second movable member in a direction to move said tape lifter toward its said lifted position;

means for supporting said first movable member to move said pressure roller between a tape-driving position pressing the tape into frictional driving engagement with the capstan and a non-tape-driving position spaced from the capstan;

means for supporting said second movable member to move said tape lifter between its said lowered and lifted positions and a manually manipulated grip on said second movable member enabling an operator to grasp said grip and move said tape lifter selectively through a range between said lowered and lifted positions against the urgence of said second biasing means;

means including mechanical connecting means between said first and second movable members for moving said tape lifter to its said lowered and lifted positions simultaneously with movement of said first movable member to move said pressure roller respectively to its said tape-driving and non-tape-driving positions;

said mechanical connecting means including a lost motion connection between said first and second movable members enabling manual override movement of said second movable member and tape lifter relative to and independent of said first movable member, between said lowered and lifted positions, when said first movable member is moved to place said pressure roller in its said non-tape-driving position;

whereby tape proximity to the head can be adjusted manually within the limits of said lost motion connection, to provide selected audio output level, while editing and scanning the tape in fast mode operation.

2. In reproducing apparatus, the improvement of claim 1 in which said mechanical connecting means includes a detent connection between said first and second movable members for holding said tape lifter in its said lowered position while said first movable member holds said pressure roller in its said non-tape-driving position, whereby tape can be adjusted manually and enabled by said detent connection to engage said head, to provide preselected audio output level while editing and scanning the tape in fast mode operation.

3. In reproducing apparatus, the improvement of claim 2 including means for releasing said detent connection in response to movement of said first movable member to move the pressure roller from its said non-tape-driving position to its said tape-driving position whereby the tape automatically engages the head when play mode operation is initiated.

4. In reproducing apparatus, the improvement of claim 2 in which said detent connection includes a spring-pressed ball in one of said movable members engageable with a recess in the other of said movable members.

5. In reproducing apparatus, the improvement of claim 1 including:

a solenoid in said control means energizable in response to activation of said control means in play mode, said solenoid being connected to said first movable member and effective when energized to overcome said first and second biasing means and simultaneously move said first movable member to place said pressure roller in its said tape-driving position and move said tape lifter to its said lowered position.

6. In reproducing apparatus, the improvement of claim 1 in which said first movable member is a lever pivoted to said housing about an axis intermediate the ends of said lever, said first biasing means urges said lever in one rotative direction about said axis to thereby urge said pressure roller away from said capstan, said apparatus includes solenoid means effective when energized to move said lever in the opposite rotative direction about said axis to thereby urge said pressure roller toward said capstan against the urgence of said first biasing means, and said second movable member with said manually manipulatable grip is reciprocably mounted on said housing for manual movement by said grip against urgence of said second biasing means within limits of said lost motion connection, whereby tape proximity to the head can be adjusted manually, to provide selected audio output level, while editing and scanning the tape in fast mode.

7. In reproducing apparatus, the improvement of claim 6 in which said lost motion connection comprises a pin extending from one of said movable members into a slot in the other movable member, and said apparatus includes detent means for holding said second movable member in position to hold said tape lifter in its said lowered position while said first movable member is in position to hold said pressure roller in its said non-tape-driving position, whereby tape can be adjusted manually by means of said grip within limits of relative movement of the pin and slot, and said detent means enables said tape to engage the head, to provide preselected audio output level, while editing and scanning the tape in fast mode.

8. In reproducing apparatus, the improvement of claim 6 in which said detent means comprises a spring-pressed ball in one of said movable members movable along a relatively smooth surface on the other movable member and engageable with a recess in the other movable member.

* * * * *

UNITED STATES PATENT OFFICE
CERTIFICATE OF CORRECTION

Patent No. 4,040,114    Dated August 2, 1977

Inventor(s) John P. Jenkins

It is certified that error appears in the above-identified patent and that said Letters Patent are hereby corrected as shown below:

Col. 1, line 21; "of", second occurrence, should be --and--

Col. 5, line 8; "om" should be --in--

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*